United States Patent [19]

Klinedinst et al.

[11] 4,452,872
[45] Jun. 5, 1984

[54] ELECTROCHEMICAL CELL

[75] Inventors: Keith A. Klinedinst, Marlborough; Richard A. Gary, Everett, both of Mass.

[73] Assignee: GTE Laboratories Incorporated, Waltham, Mass.

[21] Appl. No.: 547,595

[22] Filed: Nov. 1, 1983

[51] Int. Cl.³ .............................................. H01M 4/36
[52] U.S. Cl. ..................................... 429/105; 429/196; 429/212
[58] Field of Search ................ 429/101, 105, 196, 212

[56] References Cited

U.S. PATENT DOCUMENTS

| 4,219,443 | 8/1980 | Klinedinst et al. | 429/196 X |
| 4,252,875 | 2/1981 | Venkatasetty | 429/196 |
| 4,272,593 | 6/1981 | Klinedinst | 429/101 |

Primary Examiner—Charles F. Lefevour
Attorney, Agent, or Firm—David M. Keay

[57] ABSTRACT

A primary electrochemical cell having an oxidizable active anode material, a cathode current collector, and an electrolytic solution comprising a liquid cathode material and an electrolyte solute dissolved therein. The cathode current collector includes a catalytic material comprising a mixture of carbon and a polymer which is the product of the reaction of a transition metal salt such as ferric acetylacetonate or colbaltic acetylacetonate with tetracyanoethylene.

19 Claims, 2 Drawing Figures

ELECTROCHEMICAL CELL

BACKGROUND OF THE INVENTION

This invention relates to electrochemical cells. More particularly, it is concerned with primary electrochemical cells having an oxidizable active anode material, a cathode current collector, and an electrolytic solution comprising a reducible liquid cathode material and an electrolyte solute dissolved therein.

A particularly effective class of primary electrochemical cells which employs soluble or liquid cathode materials, as opposed to the more conventional solid cathodes, has undergone rapid development in recent years. In these cells the active cathode material is usually a fluid solvent for an electrolyte solute which provides conductivity. The active anode of the cell is usually lithium or other highly electropositive metal. During discharge the solvent is electrochemically reduced on a cathode current collector.

A wide variety of materials have been employed to make up cathode current collectors. Improved cathode current collectors and methods of making them are described in U.S. Pat. No. 4,219,443 to Keith A. Klinedinst and Francis G. Murphy. Improved high rate performance characteristics have been obtained with lithium/oxyhalide electrochemical cells employing a cathode current collector fabricated of a composite of carbon black particles with platinum particles supported thereon. These cells are disclosed and claimed in U.S. Pat. No. 4,272,593 to Keith A. Klinedinst. Another class of materials which have been employed as catalysts in cathode current collectors for reducing an oxyhalide solvent are metal phthalocyanines. Cells employing these materials are described in U.S. Pat. No. 4,252,875 to Hanumanthiya V. Venkatasetty. Although improved high rate performance characteristics have been obtained with cells employing the foregoing catalytic materials in cathode current collectors, they may not be suitable for certain applications because of relatively high cost or limited stability in the presence of other materials of the cell.

SUMMARY OF THE INVENTION

Improved electrochemical cells in accordance with the present invention comprise an oxidizable active anode material, a cathode current collector, and an electrolytic solution in contact with the anode material and cathode current collector which comprises a reducible liquid cathode material and an electrolyte solute dissolved therein. The cathode current collector includes a catalytic material for reducing the liquid cathode material comprising a mixture of carbon and a polymer which is the product of the reaction of a transition metal salt with tetracyanoethylene (TCNE).

DETAILED DESCRIPTION OF THE INVENTION

Figure 1:
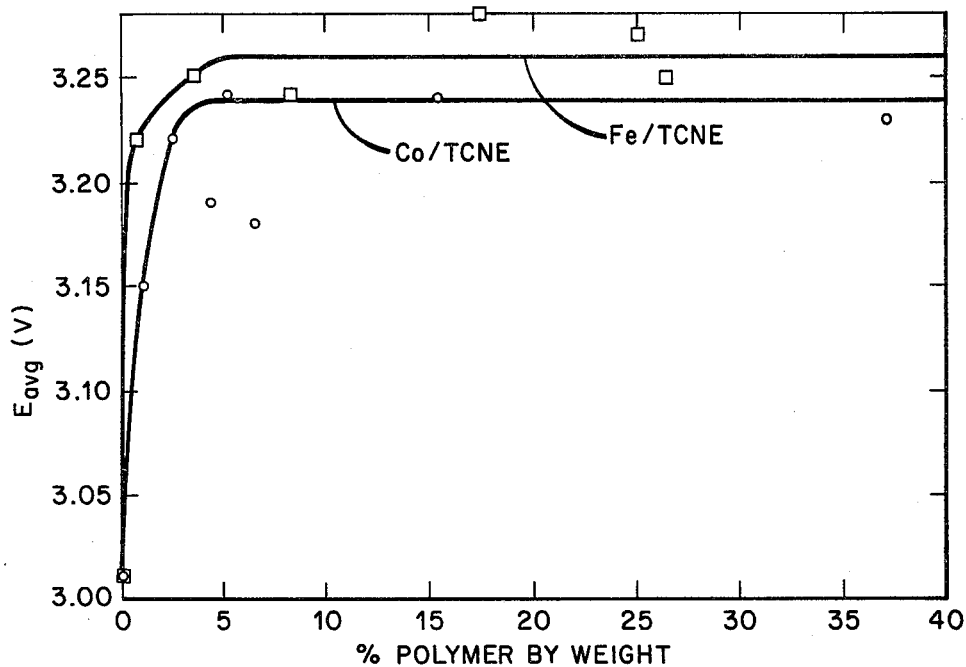
FIG. 1 is a graph showing curves of cell output voltage versus percent of polymer in the carbon-polymer mixture for polymers containing different transition metals.

Electrochemical cells in accordance with the present invention employ an anode, a cathode current collector, and an electrolytic solution which is in contact with the anode and cathode current collector. The anode and cathode current collector are separated from each other as by a thin porous layer of insulating material. The electrolytic solution comprises a fluid, reducible soluble cathode material with an electrolyte solute dissolved therein.

The anode is an oxidizable material and is preferably lithium metal. Other oxidizable materials which may be employed in electrochemical cells of this type include other alkali metals and also alkaline earth metals. The electrolytic solution comprises a solvent of a reducible liquid cathode material. Among the cathode materials found useful are fluid oxyhalides, fluid non-metallic oxides, fluid non-metallic halides, and mixtures thereof. An electrolyte solute is dissolved in the solvent in order to raise its conductivity. A thorough discussion of various useful anode materials, cathode solvents, and electrolyte solutes is provided in the above-mentioned patent to Klinedinst and Murphy.

In accordance with the present invention the cathode current collector includes a catalytic material for reducing the liquid cathode material which is a mixture of carbon and a polymer, the polymer being the product of the reaction of a transition metal salt with tetracyanoethylene (TCNE). The transition metal which provides the cation of the salt preferably is either iron or cobalt. The anion of the salt is preferably either acetylacetonate, acetate, or a halide. Ferric acetylacetonate (Fe(acac)$_3$) and cobaltic acetylacetonate (Co(acac)$_3$) are preferred salts with ferric acetylacetonate providing slightly better characteristics in an electrochemical cell.

The transition metal salt and the TCNE are reacted, and the product of the reaction is a polymer containing the transition metal. The catalytic material is a mixture of the polymer and carbon. Preferably the polymer is present in a range of from 1 to 10 percent by weight in the mixture of carbon and the polymer, and most desirably is approximately 5 percent by weight of the mixture.

The catalytic material may be formed as by suspending TCNE and a transition metal salt in an appropriate solvent such as cyclohexanone. These materials are reacted by heating near the boiling point of the solvent. The resulting polymers are washed of unreacted materials, dried, and heated to sinter within an evacuated tube. The resulting sintered polymeric materials are dispersed ultrasonically in a suitable solvent mixture and then combined by mixing with carbon black in a desired ratio. Polytetrafluoroethylene (PTFE) is added as a binder and cathode current collectors are formed by pressing the resulting mixture onto a metal screen substrate.

In accordance with another method carbon black particles are impregnated with a transition metal salt. The impregnated carbon black particles are added to a solution of TCNE employing a suitable solvent such as cyclohexanone, and the solution is heated to effect a polymerization reaction. The resulting composite of carbon black and the polymer is heated to complete the reaction. The resulting catalytic material is mixed with a suitable binder such as a PTFE and applied to a suitable substrate to form a cathode current collector. The catalytic material produced in this manner is a mixture which is a composite of the polymer and the carbon; the composite material being the polymer supported on carbon particles.

The following examples are for the purpose of further illustrating and explaining the present invention, and are not to be taken as limiting the scope thereof. The catalytic materials of the following examples were produced in essentially the same manner. Carbon particles, specifically Shawinigan acetylene black (50% compressed), were impregnated with a solution of the transition metal salt. The impregnated carbon particles were dried and then immersed in a solvent of cyclohexanone containing TCNE. Different proportions of carbon black to the transition metal salt and TCNE were employed in order to obtain a variety of mixtures for the several examples. The constituent materials were mixed, heated, and then dried. The resulting material was then sintered for three days in an evacuated tube at a temperature of 350° C. A binder of PTFE, approximately 10% by weight, was added to the mixture in the form of an aqueous dispersion. The mixture was then blended, vacuum dried, and the dried material broken up. The resulting dried composition was pressed onto a nickel screen substrate.

Test cells were fabricated which employed a lithium anode 1 cm$^2$, a separator of glass separating paper 0.007 inch thick, and a cathode current collector 1 cm$^2 \times 1$ mm thick. The electrolytic solution was 1.8 M lithium tetrachloroaluminate (LiAlCl$_4$) in thionyl chloride (SOCl$_2$). In all of the following examples the cells were tested by applying a constant load of 100 ohms. The tests were conducted at a temperature 25° C. Capacity was determined to a level of output voltage of 2.0 volts. The % polymer is the percent by weight of the polymer produced by the reaction of the transition metal salt and TCNE in the resulting mixture of the polymer and carbon black. These percentages were determined by analyses of the finished composite catalytic materials.

EXAMPLES I–VIII

Example I was a conventional electrochemical cell not containing the catalytic material in accordance with the present invention but employing a conventional carbon black cathode current collector. The cell was otherwise the same as those in the other examples. All of the cells of Examples II–VIII employed a polymer which was the reaction product of Fe(acac)$_3$ as the transition metal salt with TCNE. The percent by weight of the resulting polymer (Fe/TCNE) varied from 0.92% in Example II to 26.7% in Example VIII. The cell test results shown in Table I are average output voltage ($E_{avg}$), average current density ($I_{avg}$), and discharge capacity (C). FIG. 1 includes a curve showing the average output voltage ($E_{avg}$) versus the percent by weight of Fe/TCNE polymer in the carbon-polymer mixture and FIG. 2 includes a curve of capacity (C) versus the percentage of the Fe/TCNE polymer.

TABLE I

| | Fe/TCNE Polymer | | | |
|---|---|---|---|---|
| Example | % Polymer | $E_{avg}(V)$ | $I_{avg}$ (mA/cm$^2$) | C(mAh/cm$^2$/mm) |
| I | 0 | 3.01 | 30.1 | 27.0 |
| II | 0.92 | 3.22 | 32.2 | 62.7 |
| III | 3.66 | 3.25 | 32.5 | 71.0 |
| IV | 3.89 | 3.18 | 31.8 | 56.3 |
| V | 8.24 | 3.24 | 32.4 | 89.4 |
| VI | 17.4 | 3.28 | 32.8 | 61.8 |

TABLE I-continued

| | Fe/TCNE Polymer | | | |
|---|---|---|---|---|
| Example | % Polymer | $E_{avg}(V)$ | $I_{avg}$ (mA/cm$^2$) | C(mAh/cm$^2$/mm) |
| VII | 25.1 | 3.27 | 32.7 | 85.4 |
| VIII | 26.7 | 3.25 | 32.5 | 57.8 |

EXAMPLES I AND IX–XV

Figure 2:
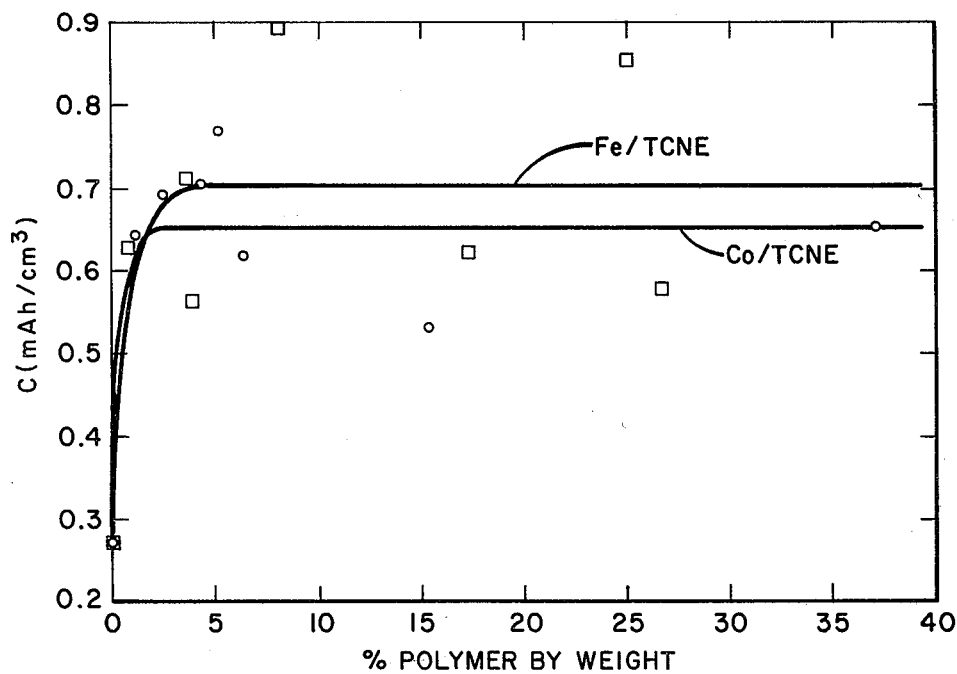
FIG. 2 is a graph illustrating cell capacity versus percent of polymer in the carbon-polymer mixture for polymers containing different transition metals.

Table II shows data for Examples IX–XV in which the transition metal salt was Co(acac)$_3$, the percent by weight of the Co/TCNE polymer varying from 1.14% in Example IX to 37.1% in Example XV. The data for Example I is repeated in Table II for purposes of comparison. FIGS. 1 and 2 include curves of average output voltage ($E_{avg}$) and discharge capacity (C) based on the data in Table II.

TABLE II

| | Co/TCNE Polymer | | | |
|---|---|---|---|---|
| Example | % Polymer | $E_{avg}(V)$ | $I_{avg}$ (mA/cm$^2$) | C(mAh/cm$^2$(mm) |
| I | 0 | 3.01 | 30.1 | 27.0 |
| IX | 1.14 | 3.15 | 31.5 | 64.0 |
| X | 2.60 | 3.22 | 32.2 | 69.0 |
| XI | 4.31 | 3.19 | 31.9 | 70.6 |
| XII | 5.28 | 3.24 | 32.4 | 76.6 |
| XIII | 6.47 | 3.18 | 31.8 | 62.2 |
| XIV | 15.4 | 3.24 | 32.4 | 53.3 |
| XV | 37.1 | 3.23 | 32.3 | 65.3 |

As can be seen in Tables I and II and the curves of FIGS. 1 and 2 improvement in both output voltage and discharge capacity are obtained with as little as 1% of the transition metal polymer. At greater than 5% little change seems to be produced in these characteristics. Also, as can be seen from the curves of FIGS. 1 and 2 slightly better average output voltage and capacity are obtained with cells employing catalytic material containing Fe/TCNE rather than Co/TCNE.

While there has been shown and described what are considered preferred embodiments of the present invention, it will be obvious to those skilled in the art that various changes and modifications may be made therein without departing from the invention as defined by the appended claims.

What is claimed is:

1. An electrochemical cell comprising
   an oxidizable active anode material;
   a cathode current collector including a catalytic material for reducing the liquid cathode material comprising a mixture of carbon and a polymer which is the product of the reaction of a transition metal salt with tetracyanoethylene; and
   an electrolytic solution, in contact with the anode material and cathode current collector, comprising a reducible liquid cathode material and an electrolyte solute dissolved therein.

2. An electrochemical cell in accordance with claim 1 wherein
   said transition metal salt has a cation selected from the group consisting of iron and cobalt.

3. A electrochemical cell in accordance with claim 2 wherein
   said transition metal salt has an anion selected from the group consisting of acetylacetonate, acetate, and the halides.

4. An electrochemical cell in accordance with claim 3 wherein
said transition metal salt is selected from the group consisting of ferric acetylacetonate and cobaltic acetylacetonate.

5. An electrochemical cell in accordance with claim 4 wherein
said mixture of carbon and said polymer contain from 1 to 10 percent polymer by weight.

6. An electrochemical cell in accordance with claim 5 wherein
said mixture of carbon and said polymer containing about 5 percent polymer by weight.

7. An electrochemical cell in accordance with claim 1 wherein
the oxidizable anode material is selected from the group consisting of alkali metals and alkaline earth metals.

8. An electrochemical cell in accordance with claim 7 wherein
the reducible liquid cathode material is selected from the group consisting of fluid oxyhalides, fluid non-metallic oxides, fluid non-metallic halides, and mixtures thereof.

9. An electrochemical cell in accordance with claim 8 wherein
said transition metal salt has a cation selected from the group consisting of iron and cobalt.

10. An electrochemical cell in accordance with claim 9 wherein
said transition metal salt has an anion selected from the group consisting of acetylacetonate, acetate, and the halides.

11. An electrochemical cell in accordance with claim 10 wherein
said transition metal salt is selected from the group consisting of ferric acetylacetonate and cobaltic acetylacetonate.

12. An electrochemical cell in accordance with claim 11 wherein
said mixture of carbon and said polymer contain from 1 to 10 percent polymer by weight.

13. An electrochemical cell in accordance with claim 12 wherein
said mixture of carbon and said polymer containing about 5 percent polymer by weight.

14. An electrochemical cell in accordance with claim 11 wherein
the oxidizable anode material comprises lithium metal; and
the reducible liquid cathode material comprises thionyl chloride.

15. An electrochemical cell in accordance with claim 14 wherein
said transition metal salt is ferric acetylacetonate.

16. An electrochemical cell in accordance with claim 15 wherein
said cathode current collector includes a layer of said mixture adherent to an inert, electrically-conductive substrate.

17. An electrochemical cell in accordance with claim 11 wherein
said mixture comprises an intimate mixture of said polymer and carbon black and includes a thermoplastic polymer.

18. An electrochemical cell in accordance with claim 17 wherein
said catalytic material comprises a composite material of said polymer and carbon.

19. An electrochemical cell in accordance with claim 18 wherein
the composite material of said polymer and carbon comprises said polymer supported on carbon particles.

* * * * *